(12) United States Patent
Jauhal

(10) Patent No.: US 9,904,606 B1
(45) Date of Patent: Feb. 27, 2018

(54) SCHEDULED RECOVERY IN A DATA PROTECTION SYSTEM

(71) Applicant: EMC Corporation, Hopkinton, MA (US)

(72) Inventor: Shern S. Jauhal, Palo Alto, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 108 days.

(21) Appl. No.: 13/927,432

(22) Filed: Jun. 26, 2013

(51) Int. Cl.
*G06F 17/30* (2006.01)
*G06F 11/14* (2006.01)

(52) U.S. Cl.
CPC ................. *G06F 11/1469* (2013.01)

(58) Field of Classification Search
USPC ................................. 707/654, 674
See application file for complete search history.

(56) References Cited

U.S. PATENT DOCUMENTS

| | | | |
|---|---|---|---|
| 6,704,886 B1 | 3/2004 | Gill et al. | |
| 7,330,997 B1 | 2/2008 | Odom | |
| 7,360,110 B1 | 4/2008 | Schmokel et al. | |
| 7,523,097 B1 | 4/2009 | Wilson | |
| 7,653,714 B2 * | 1/2010 | Yagishita | G06F 3/0605 455/412.1 |
| 8,151,140 B2 * | 4/2012 | Sim-Tang | G06F 11/1471 714/20 |
| 8,161,321 B2 * | 4/2012 | Zheng | G06F 11/1461 707/674 |
| 8,260,747 B2 * | 9/2012 | Wu | G06F 11/1451 707/644 |
| 8,316,237 B1 * | 11/2012 | Felsher | H04L 9/0825 380/282 |
| 8,365,017 B2 * | 1/2013 | Sim-Tang | G06F 11/1471 709/223 |
| 8,375,248 B2 * | 2/2013 | Sim-Tang | G06F 11/1471 709/223 |
| 8,464,101 B1 * | 6/2013 | Natanzon | G06F 11/2071 714/38.1 |
| 9,201,887 B1 | 12/2015 | Earl et al. | |
| 2003/0167408 A1 | 9/2003 | Fitzpatrick et al. | |
| 2004/0015578 A1 | 1/2004 | Karakashian et al. | |
| 2004/0117548 A1 | 6/2004 | Zamer | |
| 2005/0022176 A1 | 1/2005 | Ramachandran et al. | |
| 2005/0149577 A1 | 7/2005 | Okada et al. | |
| 2005/0216788 A1 | 9/2005 | Mani-Meitav et al. | |
| 2006/0010107 A1 | 1/2006 | Nguyen et al. | |
| 2006/0242626 A1 | 10/2006 | Pham et al. | |

(Continued)

FOREIGN PATENT DOCUMENTS

WO WO 2014/062191 4/2014

OTHER PUBLICATIONS

U.S. Appl. No. 13/930,278, filed Jun. 28, 2013, Jauhal, Shern S.

(Continued)

*Primary Examiner* — Kim Nguyen
(74) *Attorney, Agent, or Firm* — Workman Nydegger

(57) ABSTRACT

Systems and methods for scheduling a recovery operation for a host. A user interface is displayed and a recovery operation is configured. Configuration information for the recovery operation is stored and associated with a schedule that is also set via the user interface. The recovery operation may be an ad hoc recovery operation, a periodic recovery operation, and/or a validating recovery operation.

20 Claims, 3 Drawing Sheets

(56) References Cited

U.S. PATENT DOCUMENTS

| | | |
|---|---|---|
| 2007/0168656 A1 | 7/2007 | Paganetti et al. |
| 2007/0185922 A1 | 8/2007 | Kapoor et al. |
| 2008/0154989 A1 | 6/2008 | Arman |
| 2009/0037517 A1 | 2/2009 | Frei |
| 2009/0164529 A1 | 6/2009 | McCain |
| 2010/0074147 A1 | 3/2010 | Decasper et al. |
| 2011/0004629 A1 | 1/2011 | Thorat et al. |
| 2011/0161465 A1 | 6/2011 | Kowalski |
| 2011/0179415 A1 | 7/2011 | Donnellan et al. |
| 2012/0079221 A1 | 3/2012 | Sivasubramanian et al. |
| 2012/0124443 A1* | 5/2012 | Kwak .................. H04L 1/007 714/746 |
| 2012/0159595 A1 | 6/2012 | Barham |
| 2012/0233417 A1 | 9/2012 | Kalach et al. |
| 2013/0061089 A1 | 3/2013 | Valiyaparambil et al. |
| 2013/0074082 A1 | 3/2013 | Yu |
| 2014/0019414 A1 | 1/2014 | Abraham et al. |
| 2014/0082167 A1 | 3/2014 | Robinson et al. |
| 2014/0089266 A1 | 3/2014 | Une et al. |
| 2014/0173581 A1 | 6/2014 | Grinberg |
| 2014/0298490 A1 | 10/2014 | Clark et al. |
| 2014/0304830 A1 | 10/2014 | Gammon |
| 2014/0379660 A1 | 12/2014 | Vorsprach et al. |

OTHER PUBLICATIONS

U.S. Appl. No. 13/931,609, filed Jun. 28, 2013, Jauhal, Shem S.
U.S. Appl. No. 13/927,400, filed Jun. 26, 2013, Jauhal, Shem S.
U.S. Appl. No. 13/927,466, filed Jun. 26, 2013, Jauhal, Shem S.
U.S. Appl. No. 13/930,004, filed Jun. 28, 2013, Jauhal et al.
Google English translation of Chinese Application CN101795206 (A)—Aug. 4, 2010.
Ahmad et al., "Survey on secure live virtual machine (VM) migration in Cloud," 2013 2nd National Conference on Information Assurance (NCIA) Year: 2013 pp. 101-106.
Demchenko et al., "Access control infrastructure for on-demand provisioned virtualised infrastructure services," 2011 International Conference on Collaboration Technologies and Systems (CTS) Year: 2011 pp. 466-475.

* cited by examiner

Recover Configuration

Perform the Recovery

You can start the recover now or schedule the recovery to start later. You can configure a hard stop time to control how long the Recovery Wizard performs the recovery operation. When you configure a hard stop time, the Recovery Wizard stops an in-progress recovery at the specified time.

- ◉ Select the Recovery Hosts — 422
- ◉ Select the Data to Recover — 424
- ◉ Select the Recovery Options — 426
- ◉ Obtain the Volume Information — 428
- ◉ Perform the Recovery — 430
- ○ Check the Recovery Results — 432

420

Identity

Recover name: [        ]

Comment: [        ]

Recovery Start Time — 402

○ Start recovery now — 404
◉ Schedule recovery to start at — 406

[2013] [June]

| Sun | Mon | Tue | Wed | Thu | Fri | Sat |
|---|---|---|---|---|---|---|
| 26 | 27 | 28 | 29 | 30 | 31 | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 1 | 2 | 3 | 4 | 5 | 6 |

[04] : [50] : [57] [PM]

Recover Resource Persistence

◉ Persist this resource until deleted by user
○ Automatically remove this resource based on jobs database retention

— 410

Summary

Adding new recover — 412

| | |
|---|---|
| Source Client Name: | azure |
| Source Client Operating System: | Solaris |
| Destination Client Name: | azure |
| Destination Client Operating System: | Solaris |
| Recover Type: | Filesystem |
| Volume Information: | Allow NetWorker to select the required volumes for recovery (Recommended) |
| Recover List: | /.gconfg Jun 3, 2013 9:00:21 PM GMT-0700 |
| Recover File to: | Original Path |
| Duplicate file option: | Rename the recovered file |

[ < Back ] [ Run Recovery ] [ Close ]

SCHEDULED RECOVERY IN A DATA PROTECTION SYSTEM

BACKGROUND OF THE INVENTION

1. The Field of the Invention

Embodiments of the present invention relate to backing up and recovering data. More particularly, embodiments of the invention relate to systems and methods for scheduling the recovery of data in a data protection system.

2. The Relevant Technology

Computers have become ubiquitous in our society and many people interact with computers every day. People use computers to work on documents, spreadsheets, or presentations, create computer code, generate and maintain databases, send email, or the like. Computers are also used, for example, to conduct online activities such as shopping or surfing.

In each case, the user is interacting with data in some form. The data is often important and it is advisable to protect the data for many reasons. Online booking agencies and associated businesses, for example, rely on up-to-date and accurate data in order to make reservations, monitor demand, or set pricing, to name a few. Other entities and business may have in-house data (e.g., documents, reports) that also need protection.

Data can be protected by making a backup copy of the data. The backup copy is usually stored so that if something happens to the original data, the backup copy can be used for recovery purposes. Backup data can also be used for other reasons. For example, backup data enables data to be viewed as it existed at various times in the past.

Once data has been backed up, it may become necessary to recover the data for various reasons. However, a recovery process is conventionally attended by a user and the automated recovery of data. Even when data has been backed up, there is no guarantee that the data can be successfully recovered. Systems and methods are needed to automate the recovery process and to configure a recovery operation such that the recovery operation can be run unattended. Systems and methods are also needed to help ensure that backed up data can be successfully recovered.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 4 illustrates an example of a user interface for scheduling a recovery operation.

DETAILED DESCRIPTION OF THE PREFERRED EMBODIMENTS

Figure 1:
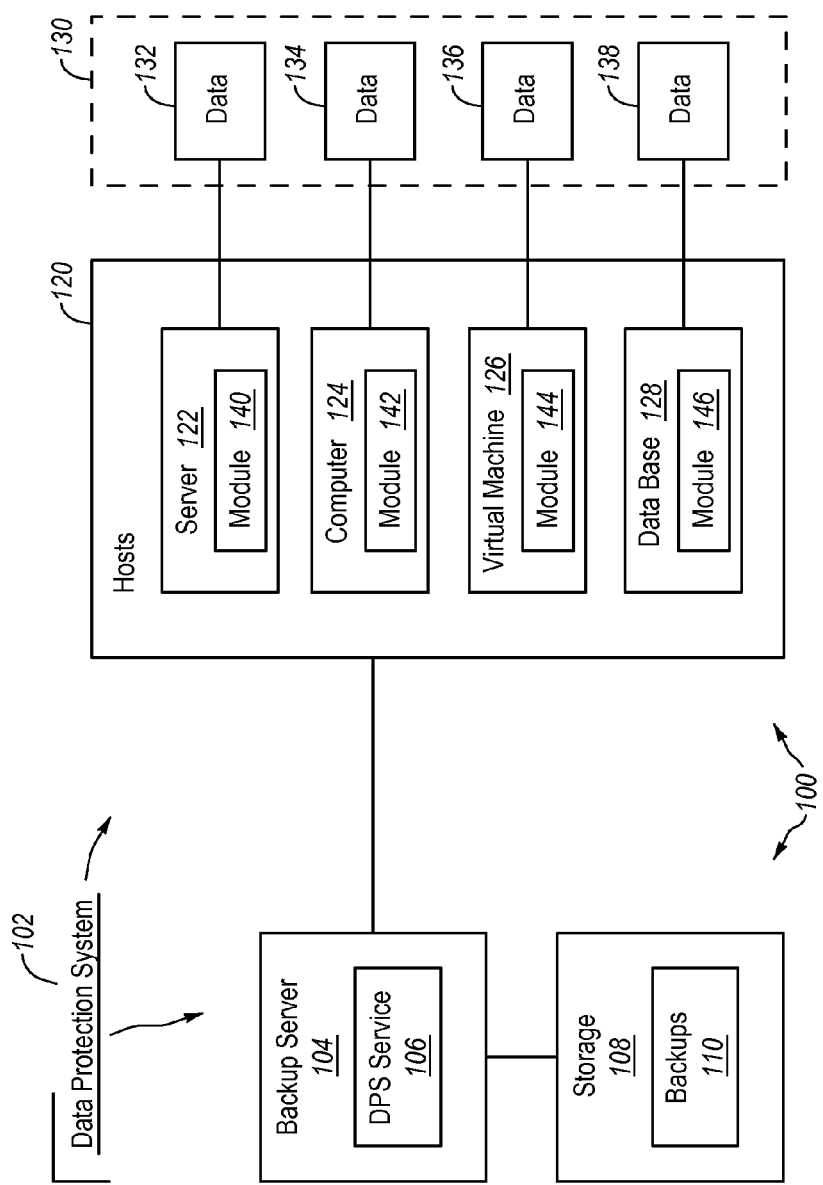
FIG. 1 illustrates an example of an environment that includes a data protection system configured to protect data.

Embodiments of the invention relate to systems and methods for protecting data. Embodiments of the invention relate a data protection system configured to protect data. Protecting data can include at least backing up the data and/or recovering the data. Embodiments of the invention enable recovery operations to be scheduled to occur in an automated manner and/or time-shifted. The recovery operations can be ad hoc recovery operations, periodic recovery operations, validating recovery operations, or the like or any combination thereof.

During a recovery operation of protected data (e.g., from a backup of the protected data), the information or configuration information necessary to perform the recovery operation is collected and saved by the data protection system. The data protection system includes a scheduling module, may be instantiated in different locations, is used to schedule the recovery operation. The scheduling module may be part of a user interface that collects the configuration information for the recovery operation. In an embodiment, scheduling the recovery operation can be integrated into a workflow of a recovery operation.

The data protection system can include various modules or components that can be installed on different devices. Some modules of the data protection system may operate on a server computer while other modules may operate on another device or computer (e.g., a host machine or host). In addition, the data protection operations discussed herein can be configured from another device. A recovery operation, for example, can be scheduled, from a host device, from a backup server, or from another device that may be remote to both the backup server and the host device for which the recovery operation is being scheduled.

The modules operating on the host and on the server cooperate schedule the recovery operation. In some instances, embodiments of the invention enable a recovery operation to be configured and the actual recovery of the data will be performed at a later time as scheduled.

The recovery of data of the scheduling of a recovery operation may be initiated through a user interface (UI) regardless of how the host is configured (e.g., a client device, a server, a database, a filestore, etc.) and regardless of the type of data on the host. The user interface may present a user with a workflow that may walk a user through the process of configuring the recovery operation. The configuration information is collected during execution of the workflow and stored until the scheduled time. Some aspects of the user interface or of the workflow may be common to all or most recovery operations that may be performed on other hosts. Other aspects of the workflow may be dynamically added to the user interface. For example, the user interface may include a plug-in that allows portions of the workflow to be adapted to the specific circumstances of the host and the host of the data.

A recovery operation can be scheduled on an ad hoc basis. In the workflow, for example, a user may be able to specify a particular time for the backup. The recovery operation can also be scheduled on a periodic basis. Each recovery of the periodic recovery may involve the same data or a different view of the data or different views of the data as the data existed at different times.

In addition, embodiments of the invention enable the backed up data to be validated. For example, once a recovery has been performed, the recovered data may be reviewed for accuracy. This may include performing heuristics on the recovered data. For example operating system commands may be used to interrogate folders or sizes in the recovered data and comparing the sizes to the size in the image. Determining whether a specific file can be read or that the file contains specific data. Checksum operations over all or part of the data can be performed. Multiple programmatic ways to check the validity of the recovered data can be performed to ensure that the data is readable and recovered.

FIG. 1 illustrates an example of an environment 100 that includes a data protection system 102 configured to protect data. Data can be protected by backing up the data and/or recovering or restoring the data and/or by configuring backup or recovery operations. The data protection system 102 in the environment 100 includes modules that are configured to backup data and/or recover data.

The environment 100 may be a network such as a local area network, a wide area network, or any other networked configuration. The environment 100 may include various devices including servers and other computers that are interconnected. The data stored in the system and/or the software operating the environment 100 may be cloud based, network based, or single computer based or combination thereof. The data protection system 102 or portions thereof may be implemented in a cloud or internet environment or other networked environment.

The data protection system 102 is implemented in the environment 100. The components or modules of the data protection system 102 can be installed on multiple devices. The data protection system 102 can include both server side components or modules and device or host side components or modules. The various modules cooperate protect data in the environment 100. The data protection system 102 can include hardware and/or software aspects.

The data protection system 102 may include, by way of example only, a backup server 104. A data protection system (DPS) service 106 may be operating on the backup server 104 or on another computer that coordinates with the backup server 104. The data protection system 102 may also include or be associated with storage 108. The storage 108 is configured to store backups 110, which are backups of data in the environment 100. The storage 108 may be networked storage, cloud based storage, disk arrays, tape media or the like or any combination thereof. The DPS service 106 may be web-enabled to enable remote access.

FIG. 1 further illustrates that the environment 100 includes hosts 120. The number of hosts 120 in the environment 100 (e.g., in a network) can vary and can be of different types. In one example, the hosts 120 may all be part of the same network or associated with the same entity. The hosts 120 can include, by way of example only, servers 122 (e.g., a file server, an email server), computers 124 (e.g., desktop computers, laptop computers, tablet devices, smartphones), virtual machines 126, databases 128, or the like or any combination thereof. Each of the hosts 120 is often associated with its own data. The server 122 is associated with the data 132, the computer 124 is associated with the data 134, the virtual machines 126 have the data 136 (the storage for the virtual machines may an integral part of the virtual machines), and the database 128 is associated with the data 138.

Generally, the data 130 of the environment may be stored on a storage pool, on hard disk arrays, on networked storage or the like or any combination thereof. Alternatively, some of the storage for some of data 130 may be specific to a particular host. For instance, the data 138 of the database 128 may be resident on storage that is not available to other hosts. Alternatively, the data 1398 may correspond to part of a storage pool or file server that has been assigned to the database 128. Other hosts may be similarly configured. More generally, however, the data 130 may be stored on multiple storage devices and in various storage configurations.

In the data protection system 102, the DPS service 106 cooperates with modules 140, 142, 144, and 146 to perform backup and/or recovery operations. When recovering the server 122, for example, the DPS service 106 coordinates with the module 140 to recover the data 132 or to recover a portion of the data 132. The DPS service 106 may also coordinate with the module 140 to configure the recovery operation for the server 122.

Backup and/or recovery operations can be performed for each of the hosts 120 individually. The recovery of data for a particular host, however, may also impact another host. For example, if the server 122 is an email server and the data 132 corresponds to the mailboxes of multiple users, then recovery of the data 132 may have an impact on other hosts—for example the computers 124 associated with the users. In addition, data can be restored to a new host that is not the host from which the data was backed up.

In some instances, the recovery operation may be performed to validation purposes. In this case, there may be no damage to the original data or the operation of the data 130. Rather, the recovery operation is performed in order to validate that the data can be successfully recovered.

The backups 110 can include one or more backups of each of the hosts 120. Advantageously, the data of the hosts 120 can be recovered at different points of time. The backups 110 may include full backups, partial backups, snapshots, content addressed data, de-duplicated data, or the like or any combination thereof.

Figure 2:
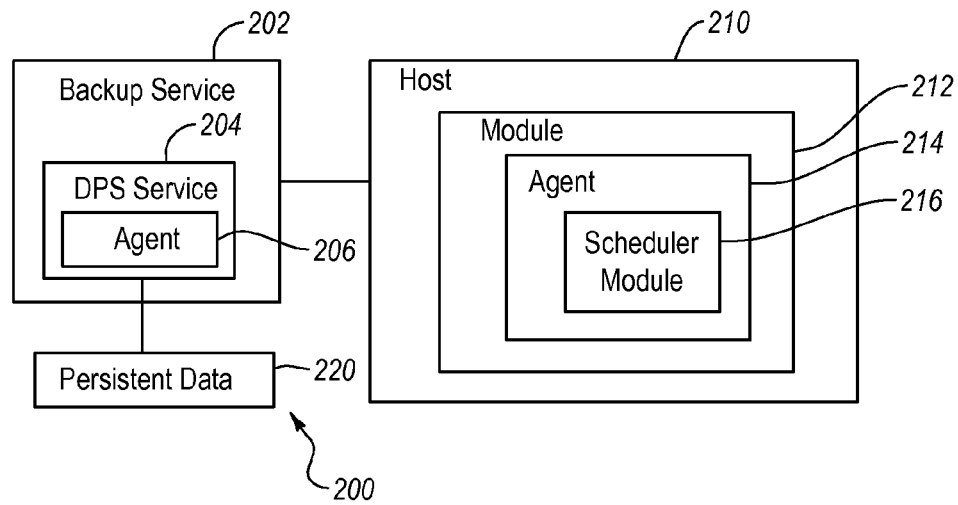
FIG. 2 illustrates an example of a backup server and a host in the context of a data protection system.

FIG. 2 illustrates an example of a backup server 202 and a host 210 in the context of a data protection system 200. The backup server 202 is an example of the backup server 104 and the host 210 is an example of one of the hosts 120. During a backup or recovery operation, the backup server 202 coordinates with the host 210 or, more specifically, the DP service 204 coordinates with the agent 214. The configuration of a backup or recovery operation, however, may be performed from the host 210 or from another device.

The DPS service 204 coordinates with the module 212 to configure and/or perform the recovery or backup operation to protect data of the host 210. The module 212 on the host 210 includes a host agent 214 and a user interface 218 that participate, in some embodiments, in the recovery and/or backup operations.

The DPS service 204 may be web enabled. This allows a user to configure a recovery operation for the host 210 from another location or device. The user interface and plug in presented over the web interface may be the same as the user interface used at the host 210 for a recovery operation.

In one example, the user interface 218 is initiated (whether on the host 210 or on a remote device) and the host 210 is selected as the destination of the recovery operation, although another host may be designated as the destination of the recovery operation. The module 212 is then queried to identify and select a client backup module, which can influence the workflow presented in the user interface 218. A client backup module is part of the data protection software and is designed to protect the storage or data of the host 210 host in a particular way. For example, the client backup module may protect a native or attached file system storage in a particular way or may protect a running application such as a database or mail server in another way.

After the client backup module is selected, the host agent 214 is initiated. The host agent 214 implements an interface between the user interface 218 and retrieves one of the modules 206, which may be plug-ins. The DPS service 204 may keep modules for various versions of the module 212. This can simplify development of the module 212 and of the user interface 218.

The user interface 218 can communicate with the agent 214, which allows the agent 214 to perform any tasks necessary to configure the recovery operation. The recovery operation can then commence. The scheduler 216, which may be part of the module 212 and may be incorporated into the user interface 218, is invoked to schedule the recovery operation.

When a recovery operation is configured and scheduled, the configuration information, the scheduling information, and/or the type of recovery can be maintained as persistent data 220. The backup server 202 can use the persistent data 220 to perform the scheduled recovery operation at the scheduled time.

Figure 3:
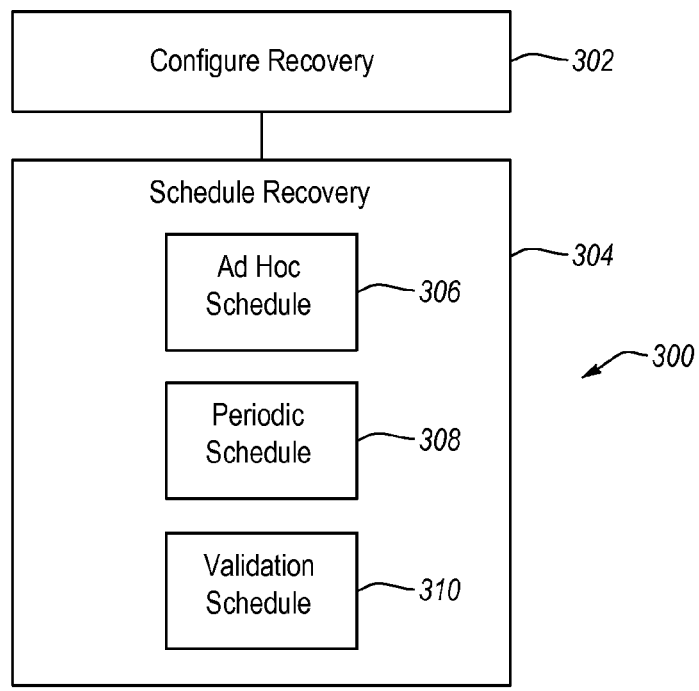
FIG. 3 illustrates a flow diagram of a method for scheduling a recovery operation for a host.

FIG. 3 illustrates a flow diagram for scheduling a recovery operation for a host. The method 300 illustrated in FIG. 3 may begin by configuring a recovery operation in box 302. Configuring a recovery operation may include accessing the DPS service, selecting a host, selecting a backup to recover to the host, selecting a type of recovery based on the client backup module, or the like.

Configuring the recovery operation also includes scheduling the recovery operation in box 304. In box 306, an ad hoc schedule may be performed. In this case, the recovery operation is scheduled to conduct a recovery based on data from a specific point in time or from a specific backup that was identified during the configuration of the recovery operation. For example, an ad hoc scheduled recovery operation may recover data from a particular time and date. In addition, an ad hoc scheduled recovery operation can be scheduled to be performed with the network is not as busy.

In box 308, a periodic schedule may be selected. In this case, a periodic schedule may cause the data protection system to perform the recovery operation on, by way of example only, a weekly basis or a monthly basis. Repeatedly recovering the exact same data can be done, but a periodic schedule may be set to use a relative date. For example, the periodic schedule may be set to recover data based on a time period that is determined at the time of the recovery operation. When the recovery operation is set for each Friday, for example, the recovery operation may recovery the data from 2 days prior. In one example, this may recover the same file, but in a time shifted manner. In other words, because the content of the file may change over time, the same data (e.g., files) may be recovered. However, the content of the data may have changed. Periodic recovery operations can validate the recovery process.

In box 310, a validation schedule may be selected and performed. A validation recovery can be used to ensure that the protected data can be successfully recovered. In box 310, the recovered data can be validated using, for example, heuristics. The data protection system may validate the recovered data by scanning the recovered data to ensure that the data is readable. The data protection system may validate the recovered data by comparing a total size of the recovered data to an expected recover size. Specific files may be opened and searched for specific terms to validate the recovery. The data may be spot-checked for accuracy. A check sum may be employed to validate the recovered data. These are examples are not limiting as other ways to validate the recovered data may be performed.

In addition, scheduling the recovery operation in box 304 may include a combination of schedules. For example, a recovery operation that is scheduled as a validating recovery operation may also be scheduled as an ad hoc recovery or as a periodic recovery. In some instances, the host or destination of the recovery operation may not be the host of the original data. This enables a recovery operation to be performed such that the user is assured that the data can be recovered without interfering with current data used by the hosts.

Embodiments of the invention can make the recovery operation an automated process and enable a recovery operation to be performed un-attended.

FIG. 4 illustrates an example of a user interface that includes elements for scheduling a recovery operation. A user interface 400 includes a workflow for performing a recovery operation, which includes scheduling the recovery operation. The user interface 400 includes a workflow 420 that includes, in one example, a method for performing a recovery operation. At 422, recovery hosts are selected. This may include selecting the host on which the user interface is displayed or selecting a different host for recovery that is different from the device on which the user interface 400 is displayed.

At 424, the data to recover is selected. This may include identifying a file, or a mailbox, or a directory, or a folder, or a partition, or other data grouping, volume or plurality thereof. At 426, the recovery options are selected. In one example, the recovery options may include the scheduling information. For example, a recovery start time such as start recovery now at 404 or schedule the recovery at 406 using a calendar 402. At 410, a user can identify whether a recover resource is to be persisted. Box 412 includes an example of configuration information that may be stored as persistent data. The recovery options may also enable the user to select an ad hoc recovery, set a periodic recovery, or set up a validating recovery.

At 428, volume information is obtained. at 430 the recovery is performed. Actually recovering the selected data to the selected host, however, may occur to the schedule selected when setting the recovery options. At 432, the recovery results may be checked or verified. Although the recovery results are verified, a validating recovery may review the recovered data in a different way including the use of heuristics, which may consume less resources.

The DPS system can protect the data of a host through, by way of example, a series of periodic data protection events (e.g., snapshots or other backup). At some point in time, a request is made to recover at least a portion of the data. A recovery operation, which is performed to recover the requested data, can be scheduled in multiple ways—ad hoc, periodic, validating, or combination thereof. The user interface on the host (or on another device) is started and a host is selected for a recovery operation. The recovery operation is then configured and the information that describes the configuration of the recovery operation is stored as persistent data. The scheduling information may also be included in the persistent data. At the scheduled time, the data is recovered in accordance with the configuration information stored in the persistent data.

Embodiments of the invention further relate to methods for preparing a host for a recovery operation, for example as illustrated at least in FIG. 3. Preparing the host can include at least one of configuring a recovery operation, scheduling the recovery operation, and/or performing the recovery operation. The actual implementation of a configured recovery operation can be time delayed. A user may schedule a recover that is performed when the system is experiencing less use (e.g., during the night).

Embodiments of the invention relate to a method for preparing a recovery operation to recover data on a host or on behalf of a host. Initially, a host is selected for the recovery operation. Once the host is selected, a user interface is displayed or presented. The user interface can include a workflow that, when executed, generates configuration information and scheduling information for the recovery operation. As previously stated, some aspects of the workflow may be generated using a plug-in. Once the recovery operation is configured and scheduled, the recovery operation is performed according to the schedule.

The embodiments described herein may include the use of a special purpose or general-purpose computer including various computer hardware or software modules, as discussed in greater detail below. Embodiments of the invention relate to methods for protecting data, devices configured to protect data, and computer-readable media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for scheduling a recovery operation to recover data in a system that includes multiple hosts, wherein different types of data stored in the system are backed up using different client backup modules, the method comprising:
    displaying a user interface on a device;
    selecting a host for the recovery operation in the user interface;
    coordinating with a backup service to identify a client backup module that backed up the host in order to determine a manner in which data of the host was backed up by the client backup module;
    coordinating with the backup service to select a recovery module from among multiple recovery modules based on the client backup module used in backing up the data of the host and based on circumstances of the host to which the data is being recovered by the recovery operation;
    retrieving the recovery module from the backup service;
    displaying the workflow in the user interface, wherein input into the workflow to configure the recovery operation is stored as persistent data by the backup server, wherein the workflow is adapted by the selected and retrieved recovery module to dynamically account for the manner in which the data was backed up by the client backup module and the circumstances of the host, wherein a portion of the workflow is common to recovery operations of different data types;
    scheduling the recovery operation such that the recovery operation is performed according to a schedule, wherein the schedule is associated with the persistent data and the recovery operation is performed in accordance with the schedule and the persistent data.

2. The method of claim 1, wherein scheduling the recovery operation includes scheduling an ad hoc recovery operation.

3. The method of claim 1, wherein scheduling the recovery operation includes scheduling a periodic recovery operation.

4. The method of claim 3, wherein scheduling a periodic recovery operation includes a relative date for each recovery operation in the periodic recovery operation.

5. The method of claim 1, wherein scheduling the recovery operation includes scheduling a validating recovery operation to validate the recovered data.

6. The method of claim 5, further comprising performing heuristics on the recovered data to validate the recovered data.

7. The method of claim 5, wherein the validating recovery operation includes an ad hoc recovery operation or a periodic recovery operation.

8. In a system that includes multiple hosts, wherein different types of data stored in the system are backed up using different backup modules, a storage device having stored therein computer-executable instructions which, when executed by one or more hardware processors of a computing system, implement a method for scheduling a recovery operation for a host, the method comprising:

selecting data to be recovered and selecting a host as a destination for the data;

coordinating with a backup service to identify a client backup module used to backup the selected data coordinating with the backup service to select a recovery module from among multiple recovery modules maintained by the backup service based on the identified client backup module and based on circumstances of the host to which the data is being recovered during the scheduled recovery operation;

retrieving the recovery module from the backup service;

displaying a user interface on a device, wherein the user interface enables the recovery operation of the selected data to be configured and wherein the user interface includes a workflow for the recovery operation;

adapting the workflow by the selected recovery module when presenting the workflow in the user interface using the recovery module retrieved from the backup service to account for a manner in which the data was backed up by the client backup module;

displaying the adapted workflow on the device;

configuring the recovery operation using input received in the workflow through the user interface, wherein the input is stored as persistent data;

storing the persistent data in a storage device;

scheduling the recovery operation in a schedule, wherein the schedule is associated with the persistent data; and performing the recovery operation by restoring the data to the host in accordance with both the schedule and the persistent data.

9. The storage device of claim 8, wherein scheduling the recovery operation includes scheduling an ad hoc recovery operation that is performed a single time.

10. The storage device of claim 9, wherein scheduling the recovery operation includes scheduling a periodic recovery operation.

11. The storage device of claim 10, wherein scheduling a periodic recovery operation includes a relative date for each recovery operation in the periodic recovery operation.

12. The storage device of claim 11, wherein the relative date for each recovery operation in the periodic recovery operation is determined according to a date on which the associated recovery operation is performed.

13. The storage device of claim 9, wherein scheduling the recovery operation includes scheduling a validating recovery operation to validate the recovered data.

14. The storage device of claim 12, the method further comprising performing heuristics on the recovered data to validate the recovered data.

15. The storage device of claim 13, wherein performing heuristics includes performing one or more of:

comparing a size of the recovered data with an anticipated size of the recovered data; and accessing a portion of the recovered data to determine if the portion of the recovered data is readable.

16. The storage device of claim 9, wherein the method further comprises performing the scheduled recovery operation.

17. The storage device of claim 9, wherein the device is the host and wherein the host is the destination of the recovered data.

18. In a system that includes multiple hosts, wherein different types of data stored in the system are backed up using different client backup modules, a computing device comprising:

at least one processor;

at least one module stored on a non-transitory computer readable medium, the module configured to configure a recovery operation to recover data, the module including:

an agent;

a user interface component; and a scheduler;

wherein the user interface component is operable to generate a user interface that presents a workflow and is configured to cooperate with a backup service to identify a client backup module that backed up the data and to determine a manner in which the data was backed up, wherein the backup service maintains a plurality of recovery modules and wherein the user interface component coordinates with the backup service to select and retrieve a recovery module from the backup service that is associated with the client backup module, wherein the workflow is configured to generate configuration information for the recovery operation by receiving input, wherein the workflow is adapted in the user interface by the selected and retrieved recovery module based on the client backup module that backed up the data such that the workflow accounts account for the manner in which the data was backed up by the client backup module and for circumstances of the host to which the data is being recovered by the recovery operation, wherein the agent cooperates with the workflow presented in the user interface to perform tasks related to configuring the recovery operation, and wherein the scheduler is responsive to input to generate a schedule for the recovery operation, wherein the schedule is associated with the configuration information, wherein the agent performs the recovery operation in accordance with the schedule and the configuration information, and wherein the schedule includes a validation schedule to check results of the recovery operation.

19. The computing device of claim 18, wherein the schedule for the recovery operation is one of an ad hoc recovery operation, a periodic recovery operation, and a validating recovery operation.

20. The computing device of claim 19, wherein the periodic recovery operation includes setting a relative date that is based on a date on which each recovery operation in the periodic recovery operation is performed, and wherein the validating recovery operation includes performing heuristics to validate the recovered data.

* * * * *